No. 737,694. PATENTED SEPT. 1, 1903.
E. L. BAUER.
VENTILATING LID OR COVER FOR CULINARY ARTICLES.
APPLICATION FILED MAY 7, 1903.
NO MODEL.

Witnesses
Jas H Blackwood
D. Randolph, Jr.

Inventor
Ervan L. Bauer
by D. A. Gourick
Attorney

No. 737,694. Patented September 1, 1903.

UNITED STATES PATENT OFFICE.

ERVAN L. BAUER, OF WELLSBURG, WEST VIRGINIA.

VENTILATING LID OR COVER FOR CULINARY ARTICLES.

SPECIFICATION forming part of Letters Patent No. 737,694, dated September 1, 1903.

Application filed May 7, 1903. Serial No. 156,051. (No model.)

*To all whom it may concern:*

Be it known that I, ERVAN L. BAUER, a citizen of the United States, residing at Wellsburg, in the county of Brooke and State of West Virginia, have invented certain new and useful Improvements in Ventilating Lids or Covers for Culinary Articles, of which the following is a specification.

My invention relates to removable covers for pots, pans, dishes, milk-crocks, &c., and has for its object to provide a device having a screen-protected ventilator to allow odors and vapors to escape from the vessel and admit pure air therein, while at the same time dust, dirt, insects, &c., will be kept out.

The construction and advantages of my invention will fully appear hereinafter and by reference to the accompanying drawings, in which—

Figure 1:
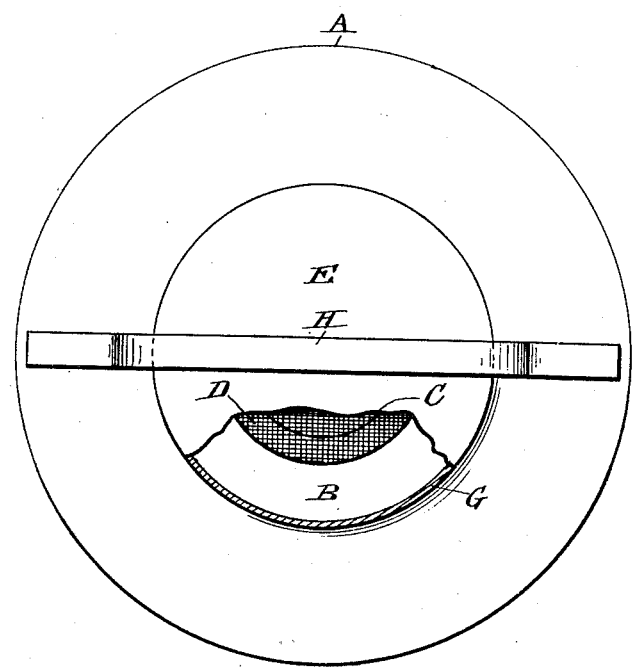
Figure 2:
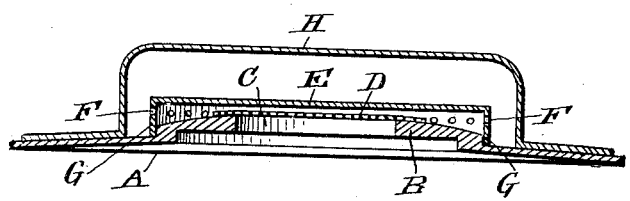

Figure 1 is a top plan view of the cover, showing the removable top partly broken away; and Fig. 2, a central cross-section of the device.

Referring to the drawings, in which similar reference characters indicate corresponding parts throughout the several views, A represents the lid made, preferably, of sheet metal and pressed upward in the center, as shown at B, and having a hole C in its center, over which is secured by any suitable means a sheet of gauze D.

E represents a top having holes F in its depending flange G, said flange being adapted to fit around the edge of raised portion B.

H represents a handle.

It will be understood from the above description that the invention is adapted to rest on any vessel and may be used with or without the top E. Generally if the contents of the vessel are hot the top E is not used until after they have cooled, when the top E may be placed in position and sufficient ventilation will be secured through perforations F, while the top will more effectually exclude dust and dirt. It will be readily understood that the device will exclude insects when top E is or is not in use.

Having thus described my invention, what I claim is—

In a lid for culinary vessels, a plate, the center thereof pressed into a circular raised portion having a hole therein, a gauze fabric secured over said hole, and a removable and replaceable top having a depending flange to fit the edge of said circular raised portion, said flange being perforated above the line of the top of said raised portion, substantially as shown and described.

In testimony whereof I hereto affix my signature in the presence of two witnesses.

ERVAN L. BAUER.

Witnesses:
 J. G. BOWMAN,
 CHAS. L. LAZEAR.